United States Patent
Quioc et al.

(10) Patent No.: US 6,871,873 B2
(45) Date of Patent: Mar. 29, 2005

(54) AIRBELT INFLATOR

(75) Inventors: Eduardo L. Quioc, Westland, MI (US); David S. Whang, Bloomfield Hills, MI (US); Chris A. Adamini, Shelby Township, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 10/374,209

(22) Filed: Feb. 26, 2003

(65) Prior Publication Data

US 2003/0160438 A1 Aug. 28, 2003

Related U.S. Application Data

(60) Provisional application No. 60/359,686, filed on Feb. 26, 2002.

(51) Int. Cl.[7] .............................................. B60R 21/26
(52) U.S. Cl. ....................................... 280/741; 280/736
(58) Field of Search ................................ 280/741, 736, 280/742, 733; 102/531

(56) References Cited

U.S. PATENT DOCUMENTS

| | | | | |
|---|---|---|---|---|
| 3,515,518 A | * | 6/1970 | Halstead et al. ............. 422/164 |
| 3,797,854 A | * | 3/1974 | Poole et al. ................. 280/741 |
| 3,827,715 A | * | 8/1974 | Lynch .......................... 280/731 |
| 3,972,545 A | * | 8/1976 | Kirchoff et al. ............. 280/735 |
| 4,017,100 A | * | 4/1977 | Gehrig et al. ................ 280/736 |
| 4,437,681 A | * | 3/1984 | Adams et al. ............... 280/733 |
| 4,578,247 A | * | 3/1986 | Bolieau ........................ 422/165 |
| 6,116,137 A | | 9/2000 | Strahan ......................... 89/196 |
| 6,142,512 A | | 11/2000 | Suyama ....................... 280/733 |
| 6,145,873 A | | 11/2000 | Takeuchi ..................... 280/733 |
| 6,170,863 B1 | | 1/2001 | Takeuchi et al. ............ 280/733 |
| 6,196,583 B1 | * | 3/2001 | Ruckdeschel et al. ...... 280/736 |
| 6,439,601 B1 | | 8/2002 | Iseki ........................... 280/733 |

* cited by examiner

*Primary Examiner*—David R. Dunn
(74) *Attorney, Agent, or Firm*—L.C. Begin & Associates, PLLC

(57) ABSTRACT

The present invention is best described as a gas generator including an inflator housing 12 containing an initiator assembly 18 and a propellant bed 44 in ignitable communication with the initiator assembly 18. The gas generator 10 further contains a filter body 14 fixed to the inflator housing 12 and coaxially aligned therewith, wherein the filter body 14 at least contains a first filter 56 and a second filter 62 such that the second filter 62 is in coaxial and linear relation with the first filter 56. If desired, the filter body 14 may additionally contain at least one perforated disc 50, at least one spacer member 54, and at least one additional filter member 62. Design requirements or specific applications determine the arrangement and addition of these components in the filter body 14.

6 Claims, 1 Drawing Sheet

AIRBELT INFLATOR

CROSS-REFERENCE TO RELATED APPLICATIONS

The present application claims the benefit of U.S. Provisional Application No. 60/359,686 filed on Feb. 26, 2002.

FIELD OF THE INVENTION

The present invention relates to vehicle occupant protection systems, and specifically to a gas generator or inflator that provides an adjustable gas output rate and tailored thrust for inflators associated with airbelts or side impact airbags, for example.

BACKGROUND

Ongoing improvements in vehicle occupant protection systems include the advent of sub systems such as a side impact airbag and an airbelt system. To facilitate such systems in a variety of vehicles, a gas generator featuring an adjustable gas output rate and a tailored thrust is desired. Although many of the state-of-the-art gas generators are useful in these contexts, ready tailoring of the gas output and the attendant inflator thrust presents certain advantages over known inflators.

SUMMARY OF THE INVENTION

An airbelt inflator (10) is provided for supplying and directing gas from the combustion of pyrotechnic materials into an inflatable safety belt or airbag. The inflator (10) preferably includes a substantially cylindrical inflator body (12) as well as a substantially cylindrical filter body (14). An initiator assembly (22) including an initiator body (24), an igniter (26), and if desired, a booster charge (40), is fixed to a first end (18) of the gas generator (10) and ignites a gas generant bed (44) upon inflator (10) operation. The bodies 12 and 14 are joined at a central circumferential weld (16) having a perforated disc 50 radially extending within the filter body 14 for separation of bodies 12 and 14.

If desired, a substantially cylindrical elongate spacer member (30) rests upon a ledge (34) within the inflator body (12), and includes a quantity of booster propellant (40). A plurality of apertures fluidly connect a first booster chamber (38) of the elongate spacer member (30) with a second propellant chamber (42) containing a quantity of main propellant (44). The second chamber (42) is separated by a perforated cushion (46) and burst shim (48) from a third chamber formed by the interior of a cylindrical spacer member (54).

Spacers having different dimensions, and thus creating spaces having different volumes can be positioned in the inflator to vary the reduction of gas output rate. A filter (56) and second perforated disc (58) separate the third chamber from a fourth chamber, also an interior of a second cylindrical spacer member (60). An output enhancer or second filter (62) is positioned adjacent the fourth chamber, and attenuates or increases the rate of gas output through a nozzle (64) positioned at an end of the inflator (10) by reducing or increasing the available flow area for gas to exit the inflator. Output enhancers having different interstitial densities may be positioned in the inflator (10) to tune the gas output for varying rates of inflation. Stated another way, output enhancers having relatively more or less metal mesh per cubic centimeter than the first filter (56) facilitate an increase or decrease in the gas pressure over time.

In the sum, the present invention is best described as gas generator including an inflator housing containing an initiator assembly and a propellant bed in ignitable communication with the initiator assembly. The gas generator further contains a filter body fixed to the inflator housing and coaxilly aligned therewith, wherein the filter body at least contains a first filter and a second filter such that the second filter is in coaxial and linear relation with the first filter. If desired, the filter body may additionally contain at least one perforated disc, at least one spacer member, and at least one additional filter member. Design requirements or specific applications determine the arrangement and addition of these components in the filter body.

The interstitial volume of the first filter is equal to, greater than, or less than the interstitial volume of the second filter. Stated another way, the metallic mesh density, that is the total grams per cubic centimeter of metal in the first filter is either greater than, less than, or equal to the metallic mesh density for the second filter. It will be appreciated that "density" as used herein refers to the total volume of metal rather than the density inherent to the type of metal as a physical property. A preferred embodiment actually contains first and second filters made from the same metal but having different metal volumes as described above.

DETAILED DESCRIPTION

Figure 1:
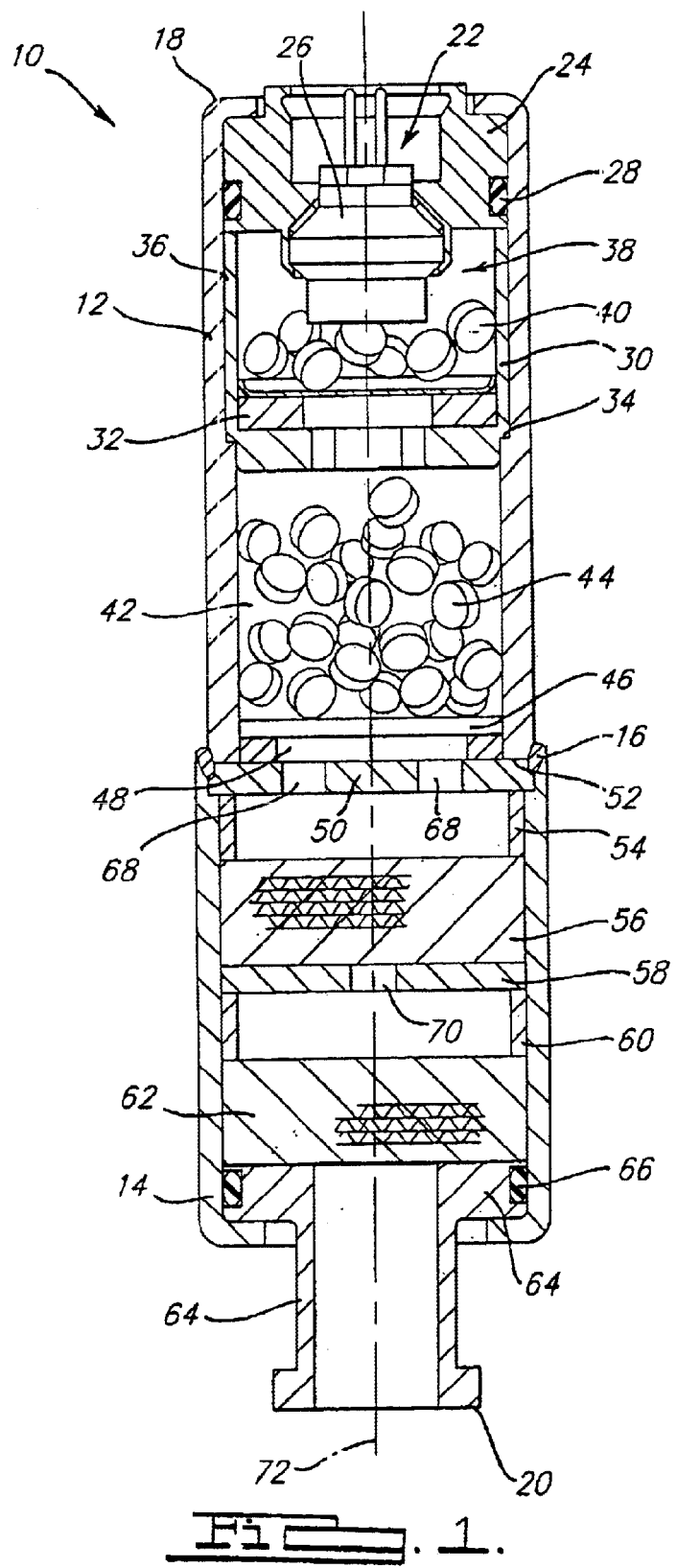
FIG. 1 is a cross-sectioned view of a gas generator in accordance with the present invention.

Referring to FIG. 1, there is shown a sectioned side view of an airbelt inflator 10 according to a preferred embodiment of the present invention. Inflator 10 is designed primarily for supplying and directing gas from the combustion of pyrotechnic materials into an inflatable vehicle safety airbelt or a side impact airbag, but is not limited thereto. Exemplary, but not limiting airbelts are described in U.S. Pat. Nos. 6,439,601, 6,116,137, 6,170,863, 6,145,873, and 6,142,512, the teachings of which are herein incorporated by reference.

Inflator 10 includes a substantially cylindrical inflator body 12, preferably metallic, as well as a substantially cylindrical filter body 14, also preferably metallic. Inflator body 12 is preferably slightly smaller in diameter than filter body 14, however, they might be of similar dimensions or inflator body 12 might even be larger than filter body 14 without departing from the scope of the present invention. In a preferred embodiment, the component body parts 12 and 14 are welded together along a circumferential weld 16, however, some other attachment method such as threads, crimping, or even an adhesive might be used without departing from the scope of the present invention. Inflator 10 preferably has a first end 18 and a second end 20. An initiator assembly 22, preferably metallic, is positioned within first end 18, and secured by crimping inflator body 12 in a conventional manner. Initiator assembly 22 includes an initiator body 24 with an attached igniter 26. It should be appreciated that some other attachment method such as mating threads or a snap-fit or press-fit connection could be used rather than crimping to hold initiator assembly 22 in place. An O-ring 28, that can be a conventional elastomeric material, preferably encircles initiator body 24, and fluidly seals first end 18 of inflator body 12. The igniter 26 or squib has a set of electrical contacts, preferably accessible from first end 18. Igniter 26 may be any suitable known igniter, for instance, the igniter taught in U.S. Pat. No. 5,934,705, herein incorporated, by reference, and is preferably communicates with a known crash sensor algorithm typically used in a vehicle occupant protection system, whereby it can be activated in a conventional manner.

In a first embodiment, initiator body 24 rests upon a substantially cylindrical spacer member 30 having a perforated end plate 32, the spacer member 30 abutting an interior ledge 34 integral to an inner wall of inflator body 12. As such, when first end 18 is crimped, initiator assembly 22 and spacer member 30 are held securely in place between first end 18 and ledge 34. In an embodiment having mating threads on initiator body 24 and inflator body 12, twisting of initiator body 24 relative to inflator body 12 could similarly secure the components rather than crimping the inflator body 12.

Spacer member 30 preferably includes an elongate sidewall 36 that spaces initiator assembly 22 from end plate 32, creating a first chamber 38. In a preferred embodiment, a booster charge 40 as well as an autoignition material are placed in cavity 38, and are ignited by igniter 26 in a conventional manner. A second chamber 42, is formed opposite perforate end plate 32 and contains the main propellant charge 44. As shown in FIG. 1, end plate 32 separates the first chamber 38 from the second chamber 42. The charge or gas generant composition may be any suitable propellant known in the art, and preferably consists of a non-azide propellant in tablet form. Exemplary, but not limiting compositions are described in U.S. Pat. Nos. 5,872,329, 5,756,929, and 5,386,775, herein incorporated by reference. A cushion 46 is preferably placed adjacent the main propellant charge 44, and assists in cushioning the propellant tablets against abrasion and degradation during normal vehicular operation. A burst shim 48 is positioned adjacent cushion 46, and is ruptured shortly after ignition of propellant charge 44 in a conventional manner. Inflator 10 is preferably assembled by first welding the body components 12 and 14, then serially positioning the interior components in coaxial alignment and in an innermost to outermost fashion, i.e. inserting those components adjacent weld union 16 first, and inserting the components adjacent first end 18 or second end 20 last.

In a preferred embodiment, the components situated within filter housing 14 include a perforated disc member 50 is preferably positioned to abut a cylindrical end surface 52 of inflator body 12, and is adjacent weld union 16. An open-ended substantially cylindrical spacer 54 is preferably positioned adjacent disc member 50 on a first side, and is adjacent a filter 56 on a second side. Filter 56 is preferably a well-known conventional metallic mesh filter provided by Wayne Wire Cloth of Hillman, Mich. or by Expan Metal of Saginaw, Mich. however, some other suitable type of filter might be substituted. Filter 56 removes combustion slag from the inflation gas in a conventional manner, and also serves as a heat sink to lower the temperature of the inflation gas leaving inflator 10.

In a preferred embodiment, a second perforated disc 58 is positioned adjacent filter 56, outwardly toward second end 20 and abuts a second substantially cylindrical spacer 60. Next to spacer 60 is an output enhancer or second filter 62, preferably a metallic mesh filter similar to filter 56 accordingly, the metal used in filters 56 and 62 is preferably the same, however, the density of the metal, or gm/cm$^3$ may differ to facilitate either attenuated or increased flow through filter body 14. A nozzle 64, preferably a single metallic piece, is positioned adjacent output enhancer 62 and preferably includes a circumferential O-ring 66 similar to O-ring 28, creating a fluid-tight seal at second end 20. In a preferred embodiment, second end 20 is crimped to secure the various components therein, however, mating threads on nozzle 64 and filter body 14 might be used instead.

Inflator 10 is relatively small, lightweight, and easy to manufacture. In addition, the various components positioned in inflator body 12, and in particular in filter housing 14, can be positioned and organized in a wide variety of ways. Because each combination of filters, discs, enhancers, spacers, and a nozzle produces different gas output characteristics, the present invention allows the inflator's output to be tuned for different applications. For example, one embodiment of the present invention includes a first perforated disc 50 having a plurality of apertures 68, and a second perforated disc 58 having a single central aperture 70. An alternative embodiment could include the same discs, but with switched positions, resulting in differing gas flows. Numerous other arrangements are possible and additional discs or filters might even be positioned in filter body 14 for other applications.

In the event of an impact, sudden vehicle deceleration, or other desired condition, an electrical signal is sent to igniter 26 from an onboard electronic controller (not shown) in a conventional manner. Igniter 26 subsequently ignites the gas generant booster tablets located in first cavity 38. Ignition of booster tablets 40 results in a relatively rapid ignition of the main charge tablets 44 in second cavity 42. Ignition of main charge 44 results in the very rapid creation of combustion gases in inflator body 12, and a consequent very rapid rise in the internal gas pressure in inflator body 12. When the internal gas pressure has risen to a sufficient level, it ruptures burst shim 48 in a conventional manner. Thenceforth, the gas flows into filter body 14, through the various components, and out nozzle 64 into an associated airbelt or airbag (not shown). In a preferred embodiment, inflator 10 is positioned in a vehicle B-pillar, and is operable to direct inflation gas into an inflatable safety restraint belt when activated by a vehicle sensing system. However, inflator 10 might also be positioned in a vehicle C-pillar, or even elsewhere in the vehicle. Furthermore, inflator 10, although especially useful in vehicle airbelts, may also be applicable in other vehicle occupant protection airbags.

In a second embodiment, the filter body 14 may contain fewer components than those described above. The components that are included, however, are still all coaxially aligned with a longitudinal axis 72 extending through the inflator body 12 and the filter body 14. For example, the filter body 14 might simply contain the following components arranged serially in an axially outward fashion from the weld union 16 to the second end 20: the first perforated disc 50, the first filter 56, the second filter 62, and the nozzle 64. Upon inflator operation, gas produced from-combustion of the propellant 44 is first routed through perforated disc 50 from inflator housing 12. The gas then proceeds through filter 56 for filtration and cooling thereof. Next, the gas passes through filter 62 for the desired modification of the attendant gas flow and/or thrust. Finally, the gas passes through the nozzle 64 now characteristic of the various thrust, temperature and flow properties imparted by passage through filter housing 14.

Several situations illustrate how the filters are believed to work together to modify the gas pressure over time:

1) First, if the metal mesh density, or gm/cm$^3$ of metal in filter 56 is greater than that of filter 62 (all other things being equal, e.g. volume and type of metal used) than the chamber pressure would exhibit a relatively gradual increase over time.

2) Secondly, if the metal mesh density, or gm/cm$^3$ of metal in filter 56 is less than that of filter 62 (all other things being equal, e.g. volume and type of metal used) than the chamber pressure would exhibit a sharp increase over a relatively shorter period of time (i.e. exhibit a much steeper slope).

3) Thirdly, if the metal mesh density, or gm/cm$^3$ of metal in filter 56 equaled that of filter 62 (all other things being equal, e.g. volume and type of metal used) than the chamber pressure would exhibit an increase intermediate of situations (1) and (2) over time.

It should be noted that the metal mesh filters 56 and 62 will preferably contain from 35–60% by volume of metal mesh with respect to the total interstitial volume represented in each filter. In general, the interstitial volume is inversely related to the metallic mesh volume in each filter. Stated another way, the greater the density of metal mesh, the lesser the interstitial volume within the same filter.

Finally, as noted above, the other components may also be optimized to facilitate various gas flow and temperature regimes based on design requirements. For example, gas thrust can be modified by combining perforated discs and spacers to create either a throttling or venturi type of effect. As such, altering the number of perforations or gas orifices in a respective disc, for example, will necessarily alter the gas flow rate. The use of a spacer following a perforated disc, therefore, could facilitate the cooling and expansion of gases as determined by customer requirements.

In essence, the present invention permits tailoring of gases flowing out of the inflator body 12 by fluid communication with a filter body 14 specifically designed for various applications such as a side-impact or an airbelt, for example. Stated another way, the filter body 14 taken as a whole could be viewed as a gas flow modifier by virtue of the many permutations or combinations of components as described above.

The present description is intended for illustrative purposes only, and should not be construed to limit the breadth of the present invention in any way. Thus, those skilled in the art will appreciate that various modifications, additions, and alterations to the presently disclosed embodiments might be made without departing from the intended scope as determined by the appended claims.

What is claimed is:

1. A gas generator comprising:
   an inflator housing comprising a first end and a second end, said housing further comprising an initiator assembly and a propellant bed ignitable by said initiator assembly; and
   a filter body in fluid communication with said inflator housing, the filter body fixed to said inflator housing and coaxially aligned therewith, the filter body comprising at least a first filter and a second filter in coaxial, spaced, and linear relation to said first filter, said filter body further comprising at least one annular spacer to facilitate the spaced relation between said first and second filters,
   wherein the interstitial volume of said first filter is either equal to, greater than, or less than the interstitial volume of said second filter, and, gas produced from combustion of said propellant axially flows from the inflator housing through the filter body, and then exits the filter body once passed through said second filter.

2. The gas generator of claim 1 wherein said filter body further comprises one or more of the following components:
   at least one perforated disc, and at least one annular spacer member, said components arranged in linear and coaxial relation with said first and second filters.

3. A gas inflator for a vehicle occupant protection system comprising:
   an inflator housing comprising an igniter and a propellant bed ignitable by said igniter; and
   a filter body in fluid communication with said inflator housing, the filter body fixed to said inflator housing and coaxially aligned therewith, the filter body comprising a first gas filter and a second gas filter in coaxial, spaced, and linear relation to said first gas filter, said filter body further comprising at least one annular spacer to facilitate the spaced relation between said first and second filters,
   wherein the interstitial volume of said first filter is either equal to, greater than, or less than the interstitial volume of said second filter, and, gas produced from combustion of said propellant axially flows from said inflator housing through said filter body and then exits the filter body once passed through the second filter.

4. The gas inflator of claim 3 wherein said filter body further comprises one or more of the following components:
   at least one perforated disc, and at least one annular spacer member, said components arranged in linear and coaxial relation with said first and second filters for modification of gas flow upon inflator operation.

5. A gas inflator for a vehicle occupant protection system comprising:
   an inflator housing comprising an igniter and a propellant bed ignitable by said igniter;
   a filter body in fluid communication with said inflator housing and downstream thereof relative to gas flow upon combustion of said propellant bed, the filter body fixed to said inflator housing end coaxially aligned therewith;
   a first filter radially constrained within said filter body for filtration of gases produced upon combustion of said propellant bed; and
   a second filter radially constrained within said filter body and downstream of said first filter, for filtration, cooling, or modification or any functional combination thereof of gas flow produced upon combustion of said propellant bed, said first filter and said second filter in coaxial, spaced, and linear relation, said filter body further comprising at least one annular spacer to facilitate the spaced relation between said first and second filters;
   wherein the interstitial volume of said first filter is either equal to, greater than, or less then the interstitial volume of said second filter, and, gas produced from combustion of said propellant axially flows from said inflator housing through said filter body and then exits the filter body once passed through the second filter.

6. The gas inflator of claim 5 wherein said filter body further comprises one or more of the following components:
   at least one perforated disc, and at least one annular spacer member, said components arranged in linear and coaxial relation with said first and second filters for modification of gas flow upon inflator operation,
   wherein said components are coaxially aligned with said first and second filters and radially constrained within said filter body, and said components are arranged and linearly ordered through the filter body to optimize the gas flow produced upon combustion of said propellant.

* * * * *

UNITED STATES PATENT AND TRADEMARK OFFICE
CERTIFICATE OF CORRECTION

PATENT NO.    : 6,871,873 B2
DATED         : March 29, 2005
INVENTOR(S)   : Quioc, Eduardo L.

It is certified that error appears in the above-identified patent and that said Letters Patent is hereby corrected as shown below:

Column 1,
Line 66, insert -- a -- before "gas"

Column 6,
Line 32, delete "end" and insert -- and --

Signed and Sealed this

Seventh Day of June, 2005

JON W. DUDAS
*Director of the United States Patent and Trademark Office*